United States Patent
Benisty (10) Patent No.: US 11,513,736 B2
(45) Date of Patent: Nov. 29, 2022

(54) REVISED HOST COMMAND GENERATION FOR UNALIGNED ACCESS

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 16 days.

(21) Appl. No.: 17/195,399

(22) Filed: Mar. 8, 2021

(65) Prior Publication Data

US 2022/0283739 A1    Sep. 8, 2022

(51) Int. Cl.
G06F 3/06    (2006.01)

(52) U.S. Cl.
CPC ............ *G06F 3/0659* (2013.01); *G06F 3/064* (2013.01); *G06F 3/0604* (2013.01); *G06F 3/0656* (2013.01); *G06F 3/0679* (2013.01)

(58) Field of Classification Search
None
See application file for complete search history.

(56) References Cited

U.S. PATENT DOCUMENTS

| | | |
|---|---|---|
| 7,296,108 B2 | 11/2007 | Beukema et al. |
| 8,352,689 B2 | 1/2013 | Noeldner et al. |
| 9,529,707 B2 | 12/2016 | Nakamura et al. |
| 2012/0221767 A1 | 8/2012 | Post et al. |
| 2016/0077962 A1* | 3/2016 | Ehrlich ............ G06F 12/0246 711/103 |
| 2017/0293426 A1* | 10/2017 | Karaje .................. G06F 3/0688 |
| 2017/0315727 A1* | 11/2017 | Vishne .................. G06F 3/0638 |
| 2018/0335943 A1* | 11/2018 | Ji .......................... G06F 3/0659 |
| 2019/0114255 A1* | 4/2019 | Jain ........................ G06F 3/068 |
| 2019/0121730 A1 | 4/2019 | Palmer |
| 2020/0142636 A1* | 5/2020 | Liao ....................... G06F 9/546 |

OTHER PUBLICATIONS

Jaehong Kim, et al., Parameter-Aware I/O Management for Solid State Disks (SSDs), 2011, IEEE Transactions on Computers, vol. 61, No. 5, 15 pp.

* cited by examiner

*Primary Examiner* — Kevin Verbrugge
(74) *Attorney, Agent, or Firm* — Patterson & Sheridan, LLP; Steven H. VerSteeg (57) ABSTRACT

A data storage device includes a memory device and a controller. The controller is configured to receive host commands, such as write commands. Upon determining that a received plurality of write commands are sequential, but includes one or more write commands that are unaligned with a memory granularity of the memory device, the one or more write commands are revised such that the one or more write commands are aligned with the memory granularity. The revised write command includes a first of the one or more write commands and a portion of a second of the one or more write commands. A beginning of the revised write command is aligned with the memory granularity and the end of the revised write command is also aligned with the memory granularity.

20 Claims, 8 Drawing Sheets

FIG. 8

REVISED HOST COMMAND GENERATION FOR UNALIGNED ACCESS

BACKGROUND OF THE DISCLOSURE

Field of the Disclosure

Embodiments of the present disclosure generally relate to data storage devices, such as solid state drives (SSDs), and performing alignment operations for unaligned sequential writes.

Description of the Related Art

When a host device generates a write command, the write command is stored in a command queue, where write commands in the command queue are retrieved by the data storage device to be executed. Write commands correspond with data of a certain length. For example, a write command includes 32 KB of data. The start of the data refers to a head and the end of the data refers to a tail. The data includes a logical block address (LBA) that specifies a location that the data is to be programmed to in the memory device. When multiple write commands are to sequential addresses, the multiple write commands may be defined as a sequential write. Similarly, reads from sequential address may be defined as a sequential read.

The sequential write is a disk access pattern where large contiguous blocks of data are written to adjacent locations on the surface of a memory device at a queue depth of one or more. Sequential writes may be common when writing large files such as video files, music files, and high definition images. When the writes of a sequential write are aligned with a pre-defined granularity, the sequential write may be completed normally. However, if one or more writes of the sequential write are not aligned with a pre-defined granularity, a bottleneck in the write operation may occur due to additional steps to re-align the unaligned data. Thus, unaligned writes may reduce the performance of the data storage device significantly when compared to aligned writes.

Therefore, there is a need in the art for an improved method of executing unaligned sequential writes.

SUMMARY OF THE DISCLOSURE

The present disclosure generally relates to data storage devices, such as solid state drives (SSDs), and performing alignment operations for unaligned sequential writes. A data storage device includes a memory device and a controller. The controller is configured to receive host commands, such as write commands. Upon determining that a received plurality of write commands are sequential, but includes one or more write commands that are unaligned with a memory granularity of the memory device, the one or more write commands are revised such that the one or more write commands are aligned with the memory granularity. The revised write command includes a first of the one or more write commands and a portion of a second of the one or more write commands. A beginning of the revised write command is aligned with the memory granularity and the end of the revised write command is also aligned with the memory granularity.

In one embodiment, a data storage device includes a memory device and a controller coupled to the memory device. The controller is configured to receive a first write command and a second write command, where the first write command is not aligned to a memory granularity of the memory device, revise the first write command such that the first write command is aligned with the memory granularity of the memory device, and write data associated with the first write command and a first portion of the second write command to the memory device.

In another embodiment, a data storage device includes a memory device and a controller coupled to the memory device. The controller includes a revised host command generator. The revised host command generator includes a command generator, one or more timers, one or more pending host command storages, and a contiguous detector to detect sequential write commands.

In another embodiment, a data storage device includes memory means and a controller coupled to the memory means. The controller is configured to modify a first command to align a size of the modified first command with a memory granularity of the memory means and modify a second command to align both a size and address of the modified second command with the memory granularity of the memory means, where the first command and the second command are sequential.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and performing alignment operations for unaligned sequential writes. A data storage device includes a memory device and a controller. The controller is configured to receive host commands, such as write commands. Upon determining that a received plurality of write commands are sequential, but includes one or more write commands that are unaligned with a memory granularity of the memory device, the one or more write commands are revised such that the one or more write commands are aligned with the memory granularity. The revised write command includes a first of the one or more write commands and a portion of a second of the one or more write commands. A beginning of the revised write command is aligned with the memory granularity and the end of the revised write command is also aligned with the memory granularity.

Figure 1:
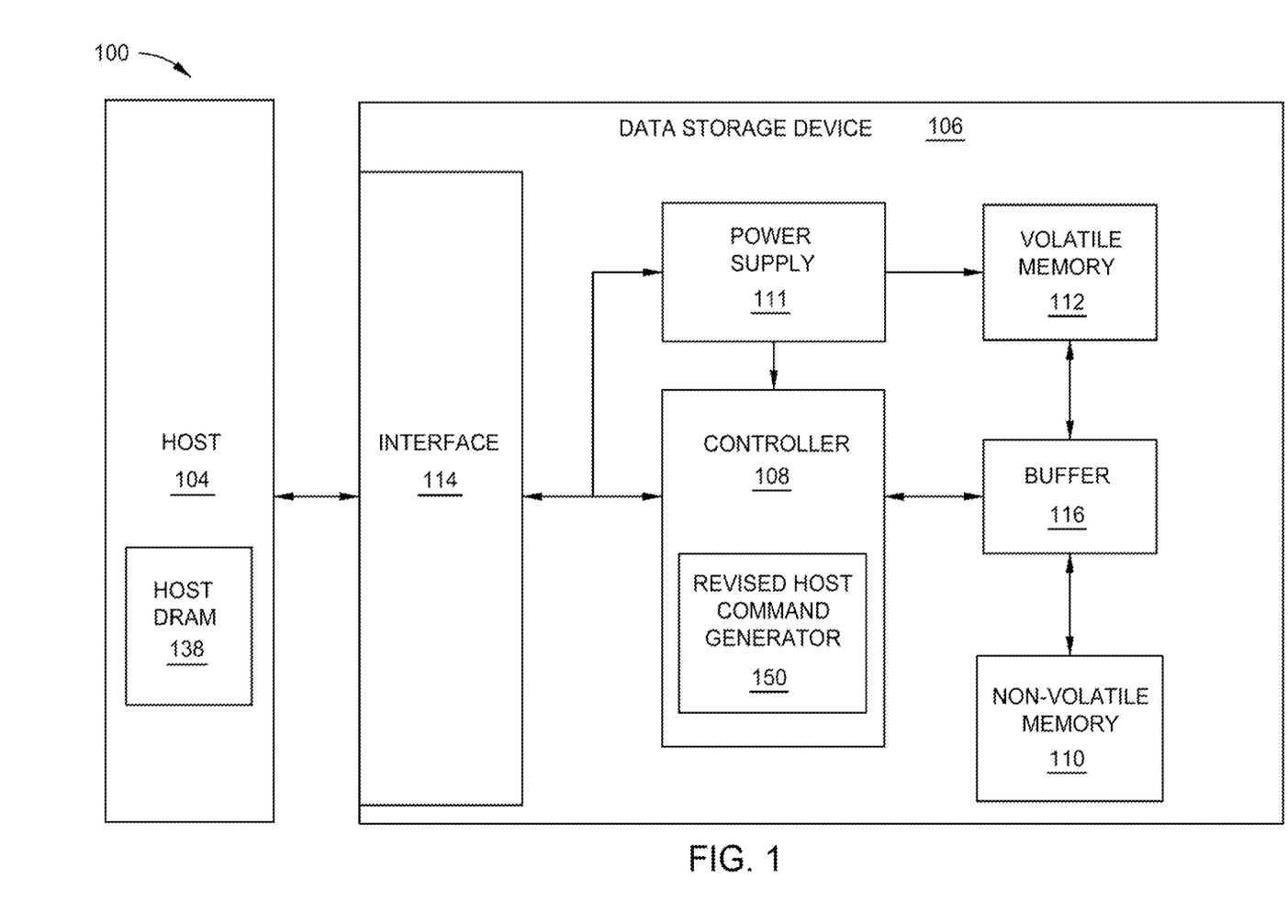
FIG. 1 depicts a schematic block diagram illustrating a storage system in which data storage device may function as a storage device for a host device, according to certain embodiments.

FIG. 1 depicts a schematic block diagram illustrating a storage system 100 in which data storage device 106 may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 includes a revised host command generator 150. The revised host command generator 150 may be configured to receive host commands and determine if the received host commands are contiguous. If the received host commands are contiguous, but are unaligned with a memory granularity, then the revised host command generator 150 may be configured to revise the received host commands, such that the revised received host commands are aligned with the memory granularity. In some embodiments, the revised host command generator 150 may be implemented per submission queue, such as each submission queue of the host device 104. In other embodiments, the revised host command generator 150 may be implemented for one or more submission queues.

Figure 2:
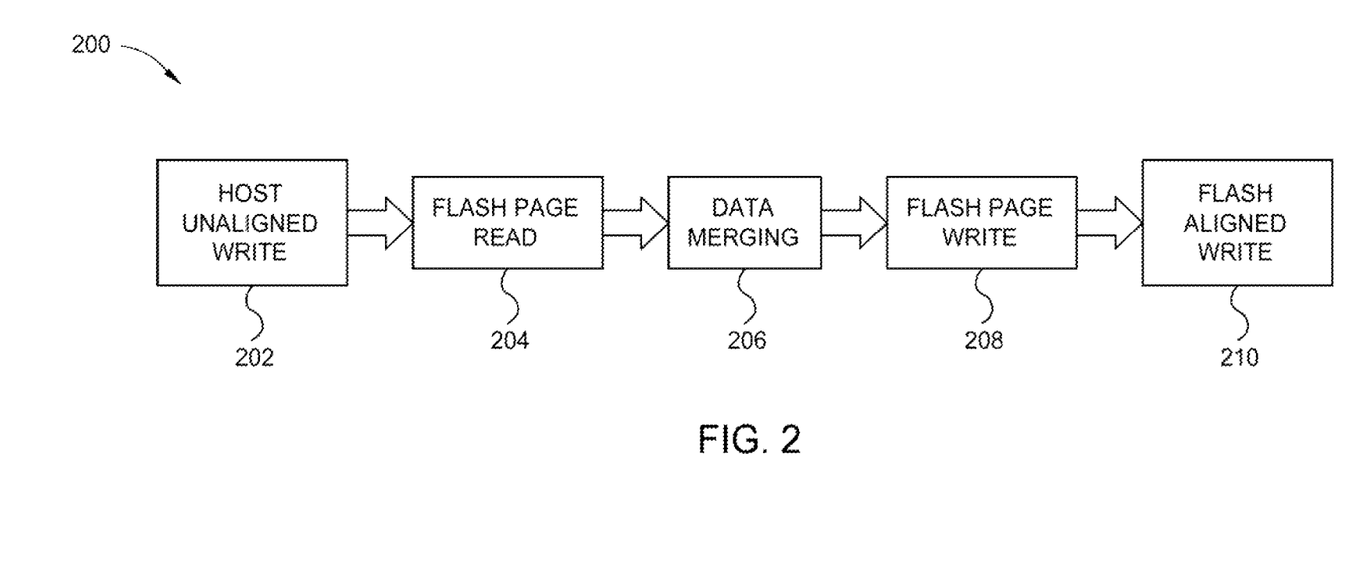
FIG. 2 depicts a flowchart of a method of writing an unaligned write command, according to certain embodiments.

FIG. 2 depicts a flowchart of a method 200 of writing an unaligned write command, according to certain embodiments. At block 202, a host unaligned write (i.e., unaligned host write command) is received by a controller, such as the controller 108 of FIG. 1. Data storage devices, such as the data storage device 106 of FIG. 1, operate (for read and write commands) in a pre-defined memory granularity, such as about 512B, about 4 KB, about 8 KB, about 16 KB, or about 32 KB. The previously listed values are not intended to be limiting, but to provide examples of possible embodiments. Accesses to a storage media or a memory device, such as the NVM 110 of FIG. 1, must be completed in the pre-defined granularity. The controller 108 operations may also be optimized to operate in the pre-defined memory granularity.

When a host write command that is not in the pre-defined memory granularity is received, the controller 108 is configured to execute a read-modify-write operation on at least an unaligned portion of the received host write command, such as the host unaligned write at block 202. At block 204, the read-modify-write operation starts with a flash page read. The flash page is read from the relevant location of the memory device, such as the NVM 110. At block 206, the received host write command is merged with the data of the flash page at block 204. The received host write command is aligned with the pre-defined memory granularity after merging the receive host write command with the data of the flash page. At block 208, the merged flash page is written back to the relevant location of the NVM 110. At block 210, the method 200 is completed with a flash aligned write.

Figure 3:
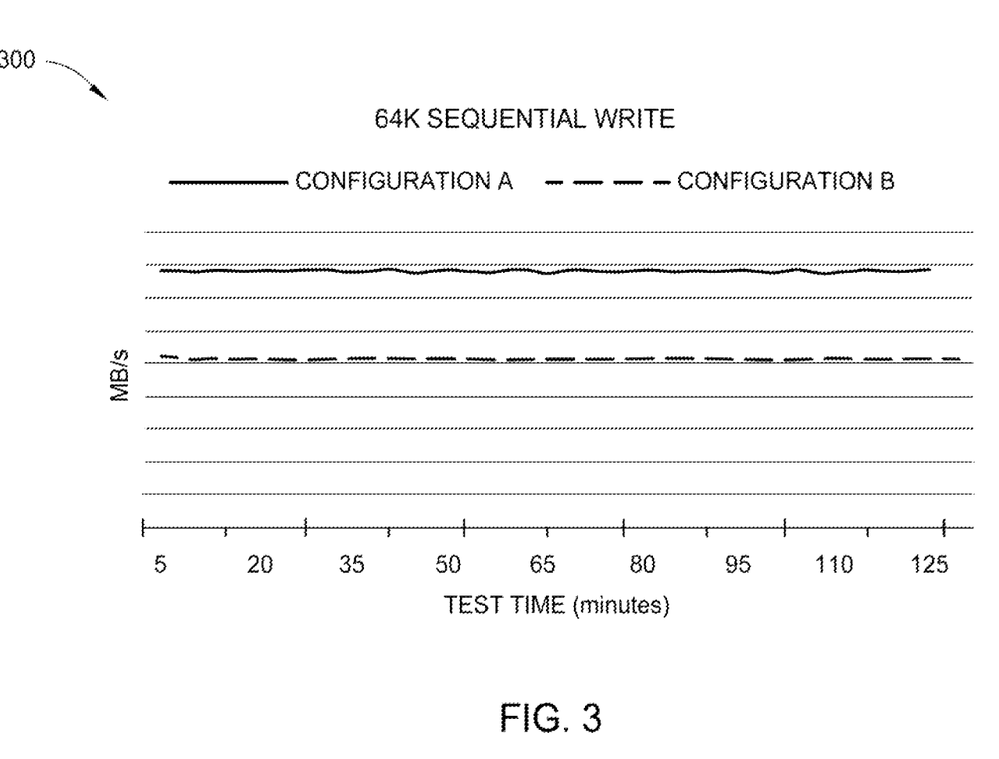
FIG. 3 depicts a graph of sequential write performances of unaligned write commands and aligned write commands, according to certain embodiments.

FIG. 3 depicts a graph 300 of sequential write performances of unaligned write commands and aligned write commands, according to certain embodiments. In one embodiment, "Configuration A" depicts the sequential write performance of aligned write commands (i.e., aligned host device, such as the host device 104 of FIG. 1, access) and "Configuration B" depicts the sequential write performance of the unaligned write commands (e.g., unaligned host device 104 access). For example, Table 1 below may illustrate the "Configuration A" write commands and the "Configuration B" write commands, where the logical block address (LBA) size is 512 B and the pre-defined memory granularity is in a size of 4 KB.

TABLE 1

| Command ID | LBA | Size |
|---|---|---|
| 0 | 0x4 | 32 KB |
| 1 | 0x44 | 32 KB |
| 2 | 0x84 | 32 KB |
| 3 | 0xC4 | 32 KB |
| 4 | 0x104 | 32 KB |
| 5 | 0x144 | 32 KB |
| 6 | 0x184 | 32 KB |
| 7 | 0x1C4 | 32 KB |

Referring strictly to the "Size" column, the series of write commands (i.e., "Command IDs 0-7") are both aligned with the LBA size and the pre-defined memory granularity. However, considering the LBA of the "Command ID 0" including an offset (i.e., 0x4 address), the series of write commands are unaligned with the LBA address even though the series of write commands are aligned with the pre-determined memory granularity. Each command has an adjacent LBA, where LBA=LBA_previous_cmd+SIZE_previous_CMD. Because the series of write commands are unaligned with the LBA address, a read-modify-write operation is required to program the command data to a memory device, such as the NVM 110 of FIG. 1. A command, such as "Command ID 0", shares the same logical 4 KB buffer as an adjacent command, such as "Command ID 1" and the adjacent command ("Command ID 1") shares the same logical 4 KB buffer as a next adjacent command, such as "Command ID 2". Thus, each command and adjacent command share the same logical 4 KB buffer and each command requires two read-modify-write operations to program the data of the command.

Referring back FIG. 3, because of the additional program operation (i.e., two read-modify-write operations per command) for each of the unaligned commands, the performance (i.e., speed of the write) is impacted. Therefore, as illustrated in FIG. 3, the performance of "Configuration A" is greater than the performance of "Configuration B".

Figure 4:
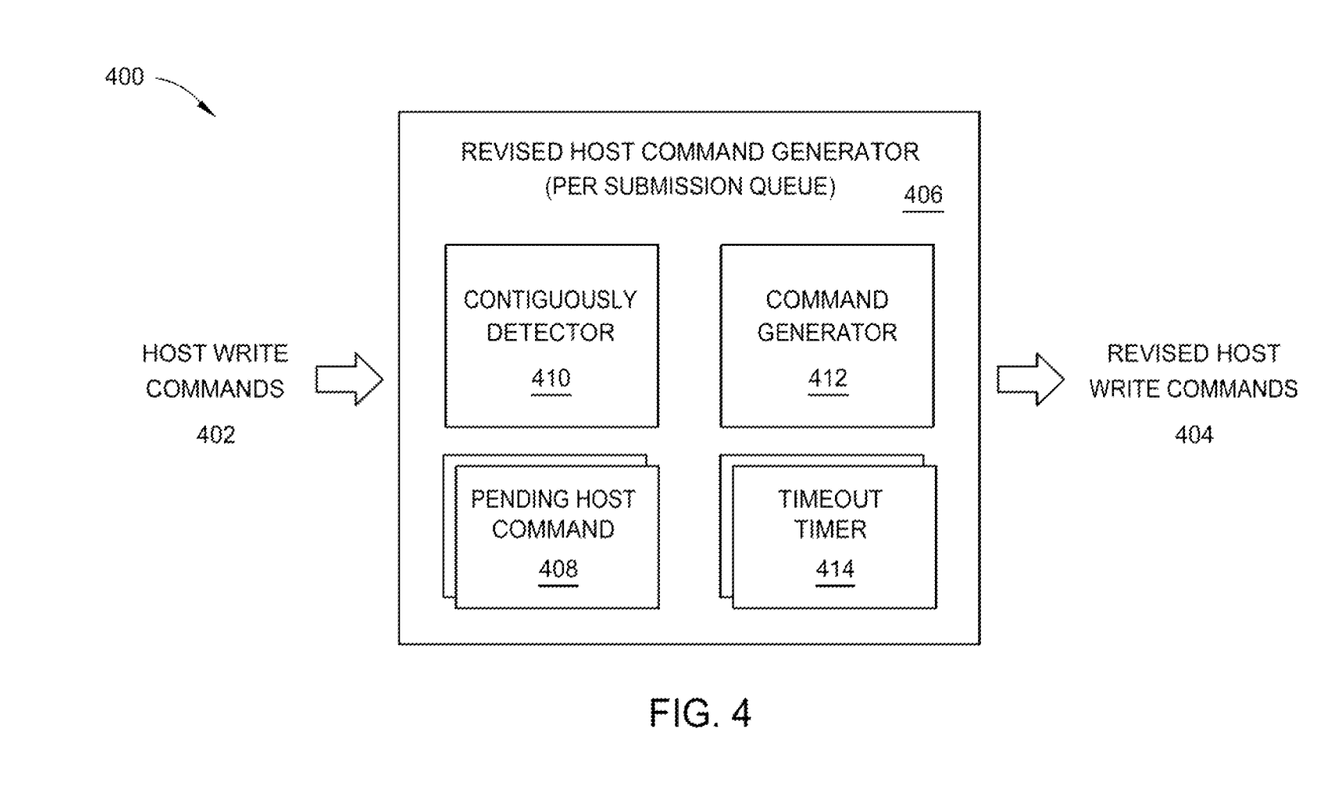
FIG. 4 depicts a schematic block diagram of a revised host write command generator, according to certain embodiments.

FIG. 4 depicts a schematic block diagram 400 of a revised host write command generator 406, according to certain embodiments. The revised host write command generator 406 may be the revised host write command generator 150 of FIG. 1. The revised host command generator 406 is implemented per submission queue. In another embodiment, the revised host command generator 406 may be implemented globally and shared by all submission queues. The revised host command generator 406 includes one or more pending host command buffers 408, a contiguously detector 410, a command generator 412, and one or more timeout timers 414. Each of the one or more pending host command buffers 408 is associated with one of the one or more timeout timers 414.

When one or more host write commands 402 are received or fetched by a controller, such as the controller 108 of FIG. 1, the one or more host write commands 402 are transferred to the revised host command generator 406. At least one of the one or more host write commands are unaligned, either by an LBA or a pre-defined memory granularity. Because each submission queue is associated with a separate revised host command generator 406, the embodiments described herein assume that each command of the one or more write commands 402 are fetched from the same submission queue and the described embodiments may be applicable to the revised host command generator 406 of the one or more submission queues.

Prior to executing, by a read-modify-write operation, a first write command that is unaligned with either an LBA or a pre-defined memory granularity, the controller 108 waits for the fetching of the next command (e.g., a second write command) from the same submission queue. The first write command may be stored in a first pending host command buffer of the one or more pending host command buffers 408. In various embodiments, the one or more pending host command buffers 408 may be volatile memory, such as SRAM or DRAM, or a controller memory buffer (CMB). When a second write command of the one or more write commands 402 arrives to the revised host command generator 406, the contiguously detector 410 determines if the second write command is adjacent to the first write command. The contiguously detector 410 may determine whether the second write command is adjacent to the first write command by a LBA and a size of each write command.

For example, referring to Table 1 above, "Command ID 0" and "Command ID 1" are adjacent to each other because of the LBA and the size of each command. If the second write command is not adjacent to the first write command, the second write command may be held in a second of the one or more pending host command buffers 408. Furthermore, in one embodiment, the first write command may be scheduled to be programmed to the memory device, such as the NVM 110 of FIG. 1. In another embodiment, the first write command may be held in the first pending host command buffer until the timeout timer of the one or more timeout timers 414 associated with the first pending host command buffer has reached a threshold value or is timed out.

When the second write command is adjacent to the first write command, a revised version of the first write command is scheduled. The command generator 412 generates one or more revised host write commands 404. The first revised write command of the one or more revised host write commands 404 includes the first write command merged with a portion of the second write command. The one or more host write commands 402 may be dynamically aligned with the pre-defined memory granularity, such that the first revised write command is aligned with the pre-defined memory granularity. In the description herein, the term "merge" refers to generating a new command that includes at least one command and a portion of another command.

The revised version of the second write command (i.e., the remaining portion of the second write command not merged with the first write command) is stored in the first pending host command buffer until a third write command that is adjacent to the second write command is received, or a timeout occurs. The modification or the revision may be completed in the front end of the internal command buffer, such that the remaining portion of the modified or revised command that is not part of the merged command is held in one of the one or more pending host command buffers 408. The first revised write command is programmed to the relevant location in the NVM 110.

Because the LBA and the size of the one or more revised host write commands 404 may be changed compared to the original one or more host write commands 402, the physical region page (PRP)/scatter gather list (SGL) tables may need to be updated. For example, an updated PRP/SGL tables with updated pointers may be stored in a controller memory buffer (CMB), a host memory buffer (HMB), a volatile memory, such as the volatile memory 112 of FIG. 1, where the volatile memory may be SRAM or DRAM, or in the NVM 110. The command generator 412 may allocate a different memory device for the pointers of the one or more revised host write commands 404 and copies the pointers from the one or more host write commands 402. Furthermore, additional PRP/SGL pointers may be required when increasing the size of a host write command, such as when the command generator 412 merges the first write command with a portion of the second write command.

Because the first write command or the revised versions of the host write commands may be stored in one of the one or more pending host command buffer 408 for an extended period of time before being programmed to the respective memory device, such as the NVM 110, a timeout timer of the one or more timeout timers 414 are implemented per pending host command buffer of the one or more pending host command buffers 408. Furthermore, because the first write command or the revised versions of the host write commands may be stored in the one or more pending host command buffers 408 for an extended period of time, the revised host command generator 406 may be configured to increase the transfer size of the first write command so that an early completion message (e.g., a completion message that is posted prior to executing the first write command) is not posted to the completion queue of the host device 104.

When the timeout timer is times out, reaches a threshold value, or expires, the pending command (i.e., first write command or the revised versions of the host write commands) stored in the timed out pending host command buffer is queued and scheduled to be programmed to the NVM 110. In one embodiment, when the submission queue has a queue depth of one, the revised host command generator 406 for that specific submission queue may be disabled. In another embodiment, the revised host command generator 406, that is disabled, may be enabled upon detecting an unaligned host write command being received.

Figure 5:
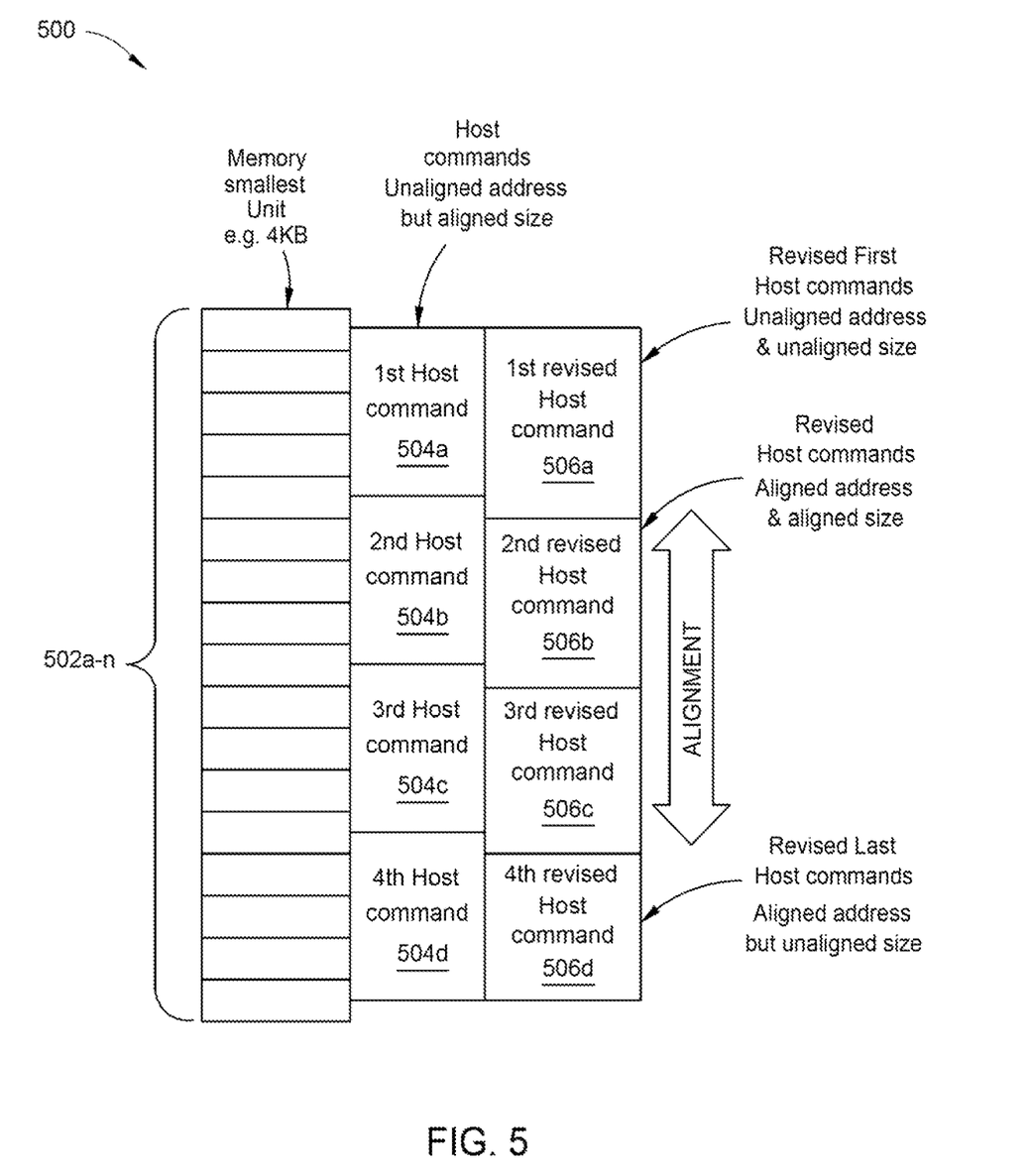
FIG. 5 depicts a schematic block diagram of a plurality of unaligned host write commands and a plurality of revised host write commands with respect to a memory granularity, according to certain embodiments.

FIG. 5 depicts a schematic block diagram 500 of a plurality of unaligned host write commands 504a-d and a plurality of revised host write commands 506a-d with respect to a memory granularity, such as a first memory smallest unit 502a, according to certain embodiments. In the description herein, the memory smallest unit may be referred to as a pre-defined memory granularity, interchangeably. FIG. 5 may be an illustration of the embodiments described in FIG. 4.

The pre-defined memory granularity is in a size of about 4 KB, where each pre-defined memory granularity unit, such as the first pre-defined memory granularity unit 502a, is in the size of about 4 KB. Each host command of the plurality of unaligned host commands 504a-d has a size of about 16 KB. Although four host commands (i.e., the plurality of unaligned host commands 504a-d) are shown, the embodiments described herein are applicable to "n" number of host commands, where "n" refers to any relevant number of host commands. Likewise, although four revised host commands (i.e., the plurality of revised host commands 506a-d) are shown, the embodiments described herein are applicable to "m" number of host commands, where "m" refers to any relevant number of revised host commands.

When a first host command 504a is fetched by a controller, such as the controller 108 of FIG. 1, the LBA and the size of the first host command 504a is checked to determine whether the first host command 504a is aligned with an LBA size and a pre-defined memory granularity. The checking may be performed by a revised host command generator, such as the revised host command generator 406 of FIG. 4. Because the first host command 504a is aligned with the pre-defined memory granularity, but not the LBA size (i.e., the LBA is offset), the first host command 504a is an unaligned write command. Likewise, the second host command 504b adjacent to the first host command 504a, the third host command 504c adjacent to the second host command 504b, and the fourth host command 504d adjacent to the third host command 504c are unaligned sequential write commands.

The first host command 504a is stored in a pending host command buffer, such as one of the one or more pending host command buffers 408 of FIG. 4. When the second host command 504b is received, where the second host command 504b is adjacent to the first host command 504a, a command generator, such as the command generator 412, generates the first revised host command 506a. The command generator 412 merges the first host command 504a with portion of the second host command 504b to generate the first revised host command 506a. The first revised host command 506a has an unaligned beginning LBA, due to the offset, and a size that is not aligned with the pre-defined memory granularity size. However, an end of the first revised host command 506a is now aligned with the LBA.

The alignment process continues for each received sequential and adjacent host command of the same submission queue, such that each of the received sequential and host commands of the same submission queue are aligned in LBA and in the pre-defined memory granularity. A beginning of the last revised host command (e.g., the fourth revised host command 506d) is aligned with the LBA, but an end of the last revised host command is not aligned with the LBA. Furthermore, the last revised host command is not aligned with the pre-defined memory granularity. It is to be understood that the revised host commands may either be aligned to the LBA and/or the size of pre-defined memory granularity.

Figure 6:
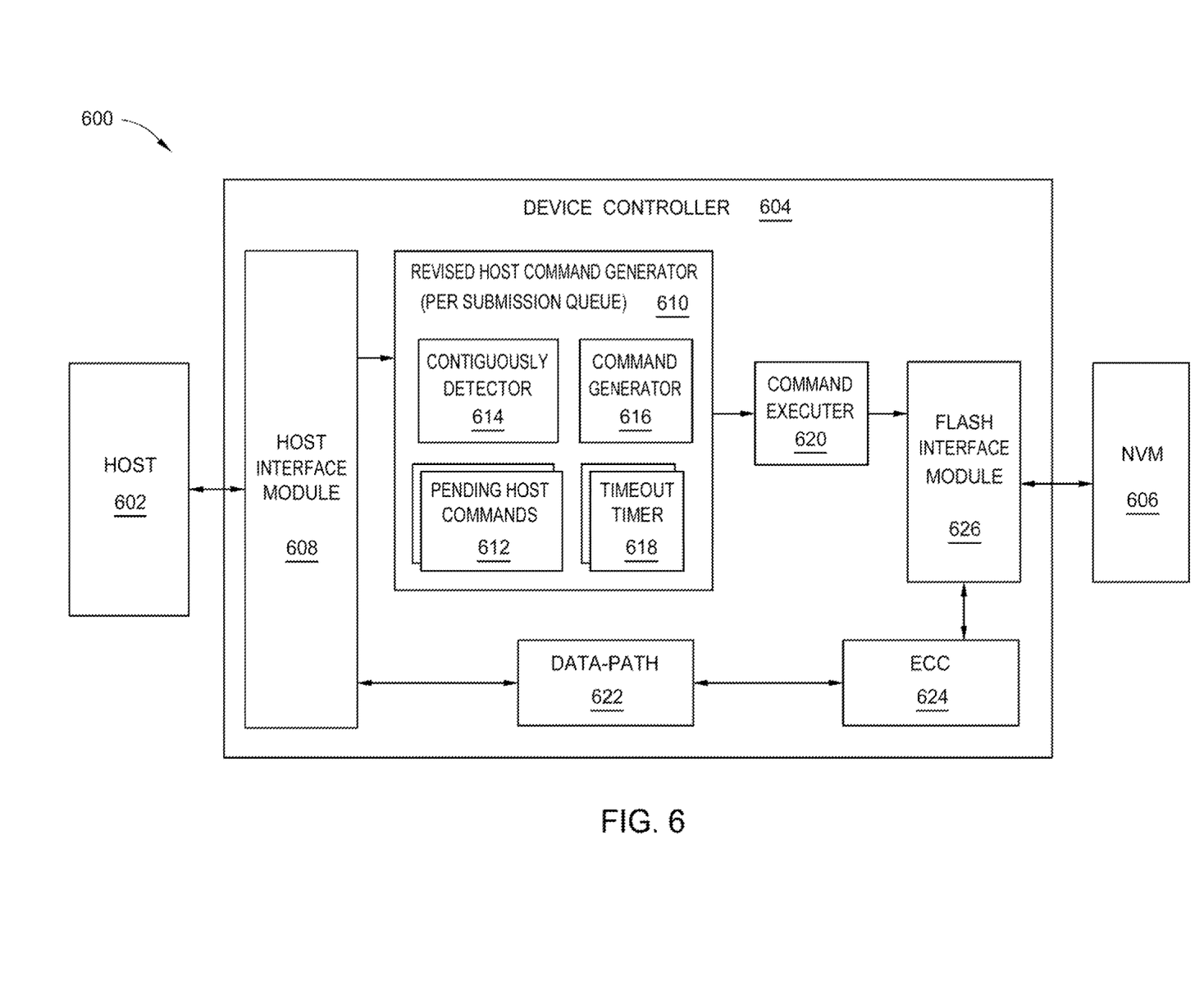
FIG. 6 depicts a schematic block diagram of a high level view of a controller interacting with a host device and a memory device, according to certain embodiments.

FIG. 6 depicts a schematic block diagram 600 of a high level view of a controller 604 interacting with a host device 602 and a memory device, such as an NVM 606, according to certain embodiments. The controller 604 may be the controller 108 of FIG. 1, where a revised host command generator 610 may be the revised host command generator 406 of FIG. 4 implemented as the revised host command generator 150 of FIG. 1. The revised host command generator 610 includes one or more pending host command buffers 612, a contiguously detector 614, a command generator 616, and the one or more timeout timers 618. Aspects of the revised host command generator 406 may be similar to the components of the revised host command generator 610. For example, the one or more pending host command buffers 612 may be the one or more pending host command buffers 408, the contiguously detector 614 may be the contiguously detector 410, the command generator 616 may be the command generator 412, and the one or more timeout timers 618 may be the one or more timeout timers 414.

The revised host command generator 610 is coupled to a host interface module (HIM) 608 and a command executer 620. The command executer 620 is coupled to a flash interface module (FIM) 626. The controller 604 includes the HIM 608 coupled to the host device 602. The HIM 608 may be configured to facilitate the transfer of data between the host device 602 and the controller 604. When data is received at the HIM 608, the data is transferred to a data path 622, where the data path 622 may include direct memory access (DMA) modules, gateways, physical region page (PRP)/scatter gather list (SGL) tables, and the like.

Prior to being programmed to the relevant location in the NVM 606, the data is passed through an error correction code (ECC) engine 624, where ECC data is generated for the data to maintain the reliability of the data against errors. Furthermore, the ECC engine 624 may be utilized to decode the ECC data during read operations. The ECC engine 624 is coupled to the FIM 626. The FIM 222 may be responsible for scheduling and programming data to the relevant location of the NVM 224 as well as retrieving the relevant data from the NVM 224.

Figure 7:
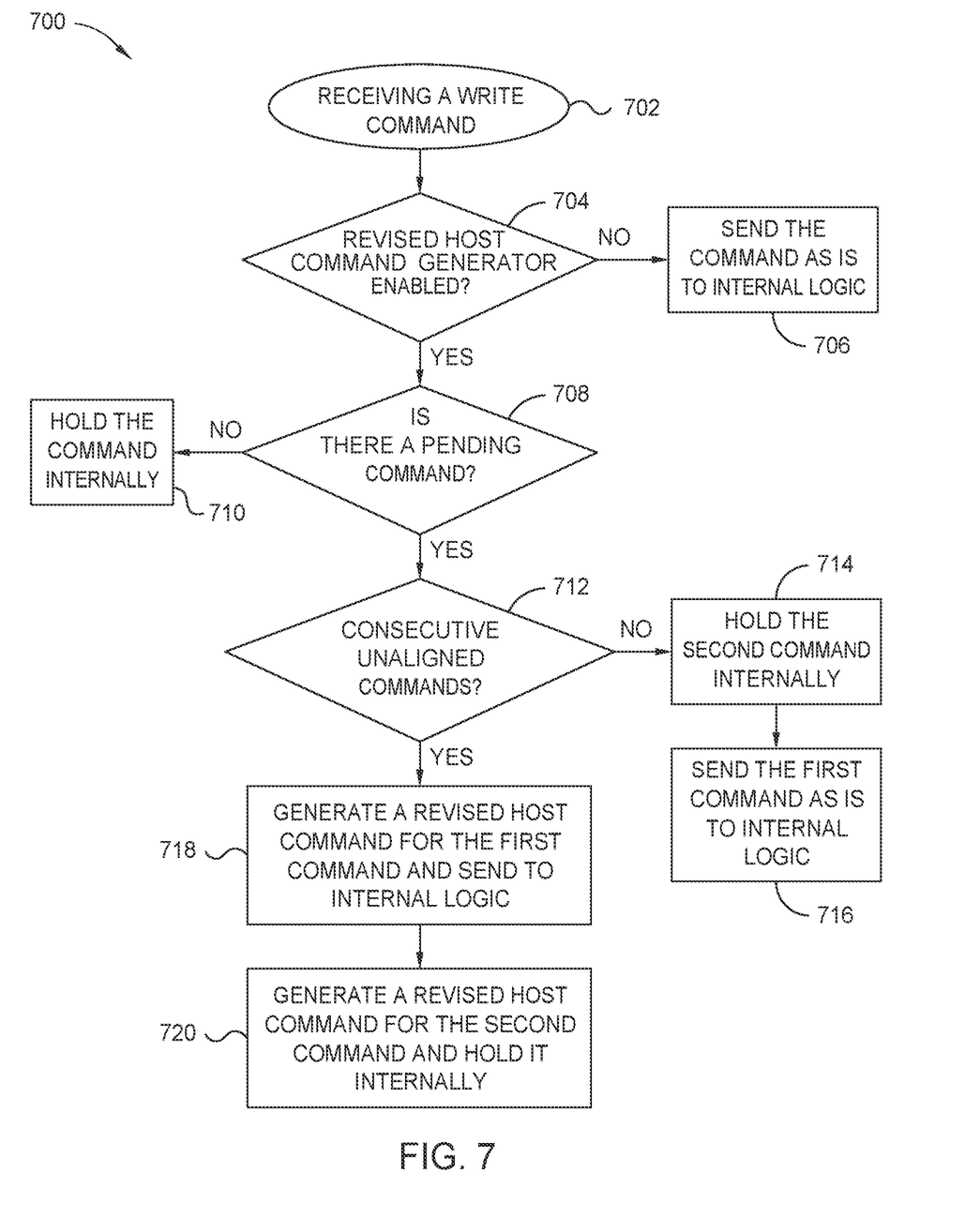
FIG. 7 depicts a schematic flowchart illustrating a method of generating revised host write commands, according to certain embodiments.

FIG. 7 depicts a schematic flowchart illustrating a method 700 of generating revised host write commands, according to certain embodiments. The method 700 may be implemented by a revised host command generator, such as the revised host command generator 150 of FIG. 1, the revised host command generator 406 of FIG. 4, and the revised host command generator 610 of FIG. 6. At block 702, an unaligned write command is received by a controller, such as the controller 108 of FIG. 1, from a host, such as the host device 104 of FIG. 1. At block 704, the controller determines if the revised host command generator logic (e.g., the revised host command generator 406 of FIG. 4, and the revised host command generator 610 of FIG. 6) is enabled. If the revised host command generator logic is not enabled, then the write command is sent as is to the internal logic at block 706.

If the revised host command generator logic is enabled at block 704, then the controller 108 determines if a pending command is located in the respective one of the one or more pending host command buffers, such as the one or more pending host command buffers 612 of FIG. 6, at block 708. If there is not a pending write command at block 708, then the received write command at block 702 is held internally in a pending host command buffer associated with the submission queue of the received write command at block 710.

However, if there is a pending write command at block 708, then at block 712, a contiguously detector, such as the contiguously detector 614 of FIG. 6, determines if the received write command and the pending write command are consecutive unaligned commands. If the received write command and the pending write command are not consecutive unaligned commands, then at block 714, the received write command is held internally in a separate pending host command buffer, where the separate pending host command buffer is different from the pending host command buffer. At block 716, after a time out occurs for the pending write command, the pending write command is sent as is to the internal logic, such as the FIM 626 of FIG. 6, to be programmed to a respective memory device, such as the NVM 110 of FIG. 1, and a completion message is posted to a completion queue of the host device 104.

However, if the received write command and the pending write command are consecutive unaligned commands, then at block 718, a command generator, such as the command generator 616 of FIG. 6, generates a first revised host command for the pending write command, where the first revised host command includes a portion of the received write command. The first revised host command is sent to the internal logic to be programmed to the respective memory device. A completion message for the first revised host command is generated by the controller 108 and posted to a completion queue of the host device 104. At block 720, a second revised host command is generated by the command generator 616 that includes the remaining portion of the received write command that was not merged with the pending write command. The second revised host command is held internally in a buffer, such as the pending host command buffer.

Figure 8:
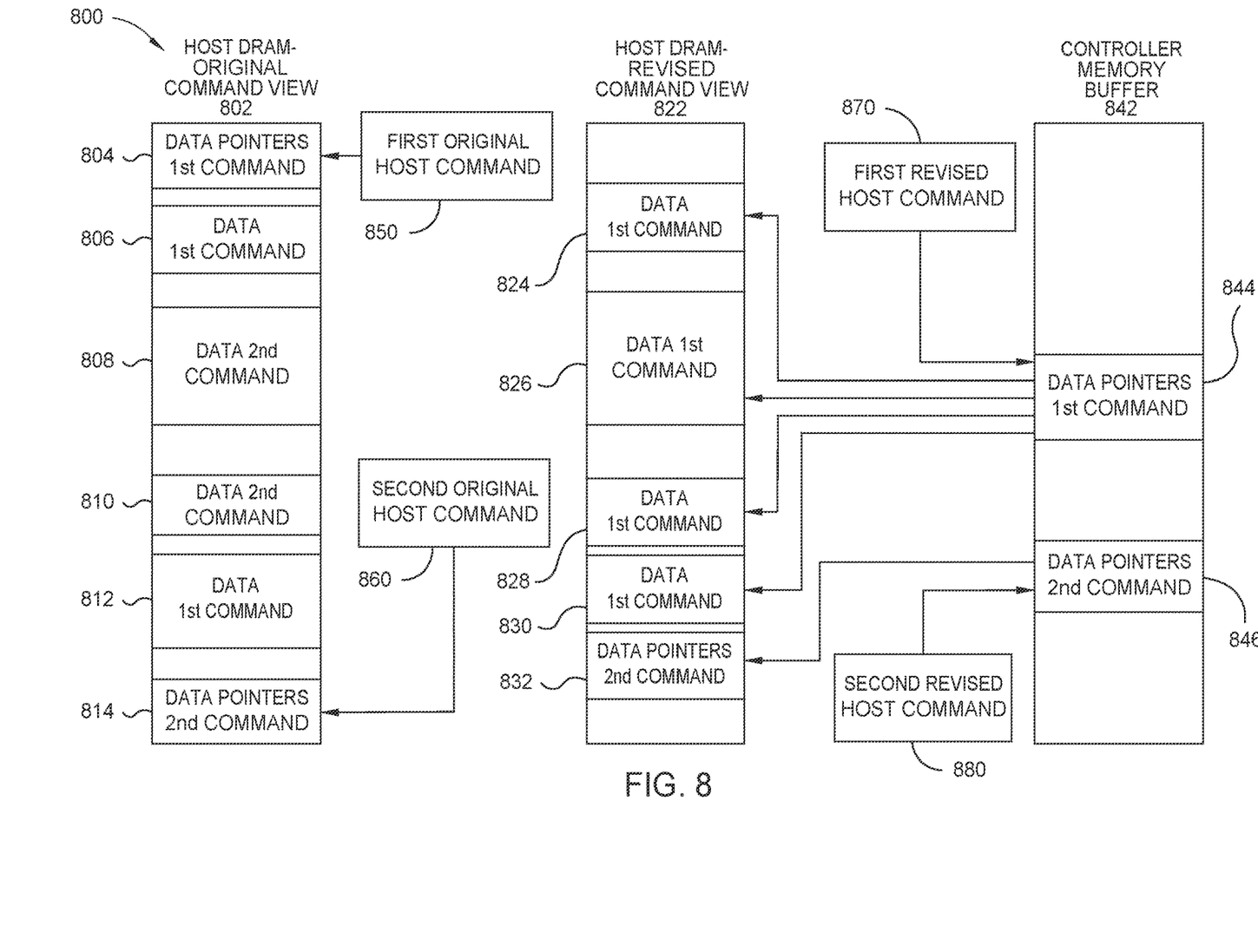
FIG. 8 depicts a schematic block diagram illustrating a host DRAM original command view, a host DRAM revised command view, and a controller memory buffer (CMB) view, according to certain embodiments.

FIG. 8 depicts a schematic block diagram 800 illustrating a host DRAM original command view 802, a host DRAM revised command view 822, and a controller memory buffer (CMB) view 842, according to certain embodiments. A first original host command 850 and a second original host command 860 point to data structures in the host DRAM, such as the host DRAM 138 of FIG. 1, where the data structures may be buffer pointers and host buffers. The buffer pointers may be represented either in a PRP or SGL table. The revised commands, such as a first revised host command 870 and a second revised host command 880, utilize new buffer pointers generated by a device controller, such as the controller 108 of FIG. 1, and stored in a CMB of a data storage device, such as the data storage device 106 of FIG. 1. The buffer pointers point to the relevant host data buffers in the host DRAM 138.

As illustrated in the host DRAM original command view 802, the data pointers and the data of the first command and the second command are mixed, such that first data of a first command 806 and second data of the first command 812 are separated by first data of a second command 808 and second data of the second command 810. Furthermore, first command data pointers 804 include data pointers for the first original host command 850. However, the first command data pointers 804 may indicate a set of non-sequential data of the same command, such as the first data of a first command 806 and second data of the first command 812. Likewise, second command data pointers 814 include data pointers for the second original host command 860, where the second command data pointers 814 is non-sequential to the data of the second original host command 860.

However, after generating revised commands for the first original host command 850 and the second original host command 860, data 824, 826, 828, 830 of a first revised command 870 is contiguous and data 832 of a second revised command 880 is contiguous as shown in the host DRAM revised command view 822. Furthermore, the data 824, 826, 828, 830 of the first revised command 870 may be larger in data size than the first original host command 850 and the data 832 of the second revised command 880 may be smaller in data size than the second original host command 860. Because a portion of the second original host command 860 data is merged with the first original host command 850 data, the data 824, 826, 828, 830 of the first revised command 870 has a larger data size than the first original host command 850.

The structure of the data pointers must be changed in order to reflect the change in the revised commands. Because the data storage device 106 is not allowed to change or add more data pointers implemented in the host DRAM 138, a revised version of the data pointers is implemented in a different memory. For example, the different memory may be located in the CMB or a host memory buffer (HMB). The revised host commands 870, 880 are linked to the revised version of the data pointers 844, 846 rather than the original data pointers 804, 814. Data pointers 844 of the first revised command points to a sequential set of data, where the sequential set of data includes first data of a first revised command 824, second data of the first revised command 826, third data of the first revised command 828, and fourth data of the first revised command 830. Likewise, data pointers 846 of the second revised command includes data pointers that point to a sequential set of data that includes first data of a second revised command 832. The data pointers 844 of the first revised command includes additional data pointers not present in the first command data pointers 804, where the additional data pointers not present in the first command data pointers 804 may be present in the second command data pointers 814.

By aligning unaligned sequential write commands by generating a merged command, the performance of sequential writes may be improved and a host interface bus may be better utilized since a single transport layer packet may hold data associated with two different commands.

In one embodiment, a data storage device includes a memory device and a controller coupled to the memory device. The controller is configured to receive a first write command and a second write command, where the first write command is not aligned to a memory granularity of the memory device, revise the first write command such that the first write command is aligned with the memory granularity of the memory device, and write data associated with the first write command and a first portion of the second write command to the memory device.

The first write command is not aligned with to the memory granularity of the memory device. The controller is further configured to revise the first write command such that an end of the revised first write command is aligned with the memory granularity of the memory device. The controller is further configured to generate first internal data pointers for the revised first command. The first internal data pointers are stored in either a controller memory buffer (CMB) or a host memory buffer (HMB). The first write command and the second write command are sequential. The first write command and the second write command are not aligned with the memory granularity of the memory device. The first write command is unaligned in logical block address (LBA) and aligned in size with the memory granularity of the memory device. The second write command is unaligned in LBA and unaligned in size with the memory granularity of the memory device. The revised second write command is aligned in LBA and aligned in size with the memory granularity of the memory device. The first write command is revised to be unaligned in LBA and aligned in size with the memory granularity of the memory device.

In another embodiment, a data storage device includes a memory device and a controller coupled to the memory device. The controller includes a revised host command generator. The revised host command generator includes a command generator, a timer, a pending host command storage, and a contiguous detector to detect sequential write commands.

The controller is configured to determine that revised host command is enabled, determine whether consecutive unaligned commands are present, and upon determining that consecutive unaligned commands are present, generate a revised host command for the detected sequential write commands. The pending host command storage is distinct from the memory device. The command generator is configured to generate revised host write commands. The revised host write commands are aligned to one or more of a size and an address of memory granularity of the memory device. The timer is configured to cause the controller to send a non-modified host write command to the memory device upon expiration of the timer. The controller is configured to post a completion message to a host device upon processing a revised host command. The pending host command storage is configured to store a host command until either the timer expires or the host command is revised and sent to the memory device. The controller is configured to dynamically align host write command sizes and addresses based upon detecting unaligned host write command sizes and addresses.

In another embodiment, a data storage device includes memory means and a controller coupled to the memory means. The controller is configured to modify a first command to align a size of the modified first command with a memory granularity of the memory means and modify a second command to align both a size and address of the modified second command with the memory granularity of the memory means, where the first command and the second command are sequential.

The controller is further configured to modify a third command to align an address of the modified third command with the memory granularity of the memory means. The modified first command has an unaligned address and wherein the modified third command has an unaligned size of the memory granularity of the memory means.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   receive a first write command and a second write command, wherein a tail end of the first write command is not aligned to a boundary of the memory granularity of the memory device, wherein the memory granularity is a memory smallest unit, and wherein the first write command is offset by less than a logical block address (LBA) size;
   revise the first write command such that the tail end of the revised first write command is aligned with the boundary of the memory granularity of the memory device, wherein revising the first write command comprises merging a first portion of the second write command with the first write command; and
   write data associated with the revised first write command to the memory device.

2. The data storage device of claim 1, wherein the second write command is not aligned with the boundary of the memory granularity of the memory device.

3. The data storage device of claim 2, wherein the controller is further configured to revise the first write command such that an end of the revised first write command is aligned with the boundary of the memory granularity of the memory device.

4. The data storage device of claim 2, wherein the controller is further configured to generate first internal data pointers for the revised first command, and wherein the first internal data pointers are stored in either a controller memory buffer (CMB) or a host memory buffer (HMB).

5. The data storage device of claim 1, wherein the first write command and the second write command are sequential, and wherein the first write command and the second write command are not aligned with the memory granularity of the memory device.

6. The data storage device of claim 1, wherein the first write command is unaligned in logical block address (LBA) and aligned in size with the memory granularity of the memory device.

7. The data storage device of claim 6, wherein the second write command is unaligned in LBA and unaligned in size with the memory granularity of the memory device.

8. The data storage device of claim 7, wherein a revised second write command is aligned in LBA and aligned in size with the memory granularity of the memory device.

9. The data storage device of claim 8, wherein the first write command is revised to be unaligned in LBA and aligned in size with the memory granularity of the memory device.

10. A data storage device, comprising:
a memory device; and
a controller coupled to the memory device, the controller comprising a revised host command generator, wherein the revised host command generator comprises:
a command generator;
a timer;
a pending host command storage; and
a contiguous detector to detect sequential write commands;
wherein the revised host command generator is implemented for each submission queue of a plurality of submission queues.

11. The data storage device of claim 10, wherein the controller is configured to:
determine that revised host command is enabled;
determine whether consecutive unaligned commands are present; and
upon determining that consecutive unaligned commands are present, generate a revised host command for the detected sequential write commands.

12. The data storage device of claim 10, wherein the pending host command storage is distinct from the memory device.

13. The data storage device of claim 10, wherein the command generator is configured to generate revised host write commands, wherein the revised host write commands are aligned to one or more of a size and an address of memory granularity of the memory device.

14. The data storage device of claim 10, wherein the timer is configured to cause the controller to send a non-modified host write command to the memory device upon expiration of the timer.

15. The data storage device of claim 10, wherein the controller is configured to post a completion message to a host device upon processing a revised host command.

16. The data storage device of claim 10, wherein the pending host command storage is configured to store a host command until either the timer expires or the host command is revised and sent to the memory device.

17. The data storage device of claim 10, wherein the controller is configured to dynamically align host write command sizes and addresses based upon detecting unaligned host write command sizes and addresses.

18. A data storage device, comprising:
memory means; and
a controller coupled to the memory means, wherein the controller is configured to:
modify a first command to align a size of the modified first command with a boundary of a memory granularity of the memory means, wherein the memory granularity is a memory smallest unit, wherein a tail end of the first command is not aligned with the boundary of the memory granularity prior to the modifying, and wherein the first command is offset by less than a logical block address (LBA) size, wherein modifying the first command comprises merging a first portion of a second command with the first command; and
modify the second command to align both a size and address of the modified second command with the boundary of the memory granularity of the memory means, wherein the first command and the second command are sequential.

19. The data storage device of claim 18, wherein the controller is further configured to modify a third command to align an address of the modified third command with the memory granularity of the memory means.

20. The data storage device of claim 19, wherein the modified first command has an unaligned address and wherein the modified third command has an unaligned size of the memory granularity of the memory means.

* * * * *